(12) United States Patent
Sabesan et al.

(10) Patent No.: US 12,484,829 B2
(45) Date of Patent: Dec. 2, 2025

(54) THIN-FILM HIGH-DENSITY SENSING ARRAY, SUB-SCALP IMPLANTATION TOOL AND IMPLANT METHOD

(71) Applicant: Verily Life Sciences LLC, South San Francisco, CA (US)

(72) Inventors: Shivkumar Sabesan, Campbell, CA (US); Benjamin Yaffe, San Francisco, CA (US)

(73) Assignee: Verily Life Sciences LLC, Dallas, TX (US)

( * ) Notice: Subject to any disclaimer, the term of this patent is extended or adjusted under 35 U.S.C. 154(b) by 914 days.

(21) Appl. No.: 17/272,013

(22) PCT Filed: Aug. 1, 2019

(86) PCT No.: PCT/US2019/044648
§ 371 (c)(1),
(2) Date: Feb. 26, 2021

(87) PCT Pub. No.: WO2020/046532
PCT Pub. Date: Mar. 5, 2020

(65) Prior Publication Data
US 2021/0378574 A1    Dec. 9, 2021

Related U.S. Application Data

(60) Provisional application No. 62/723,183, filed on Aug. 27, 2018.

(51) Int. Cl.
*A61B 5/293*    (2021.01)
*A61B 5/00*    (2006.01)
(Continued)

(52) U.S. Cl.
CPC ............ *A61B 5/293* (2021.01); *A61B 5/0006* (2013.01); *A61B 5/0031* (2013.01); *A61B 5/384* (2021.01);
(Continued)

(58) Field of Classification Search
CPC ......... A61B 5/293; A61B 5/006; A61B 5/384; A61B 5/0031; A61B 17/00234; A61B 2017/00349; A61B 5/282; A61B 5/25
See application file for complete search history.

(56) References Cited

U.S. PATENT DOCUMENTS 12,036,027 B2 *   7/2024   Olson ................... A61B 5/287
2008/0249389 A1  10/2008   Haug et al.
(Continued)

FOREIGN PATENT DOCUMENTS

EP    3342338    7/2018

OTHER PUBLICATIONS

Application No. PCT/US2019/044648, International Search Report and Written Opinion, Mailed On Dec. 4, 2019, 18 pages.
(Continued)

*Primary Examiner* — Joseph A Stoklosa
*Assistant Examiner* — Annie L Shoulders
(74) *Attorney, Agent, or Firm* — Kilpatrick Townsend & Stockton LLP

(57) ABSTRACT

Devices, systems and techniques are provided to facilitate chronic monitoring of biological signals. An implant device can include a set of branch portions. Each branch portion can include multiple electrodes disposed on a bottom surface and can have vias that connect the electrode to a trace on the top of the branch portion. Each branch portion can include a hole through which a connector (e.g., suture) can be pulled. The connector can also be threaded through a hole in a curved arm of an implantation tool, To implant the implant (Continued)

device, the implantation tool can be inserted through an incision, moved to a target location and stabilized. An end of the connector can then be pulled, which can cause the implant device to move to the target location. The implant device can then be stabilized and the implantation tool explanted.

21 Claims, 14 Drawing Sheets

(51) Int. Cl.
    *A61B 5/384*    (2021.01)
    *A61B 17/00*    (2006.01)
(52) U.S. Cl.
    CPC ............... *A61B 17/00234* (2013.01); *A61B 2017/00349* (2013.01)

(56) References Cited

U.S. PATENT DOCUMENTS

| | | | |
|---|---|---|---|
| 2015/0080906 A1* | 3/2015 | Fjorback | A61N 1/0558 |
| | | | 607/116 |
| 2016/0339233 A1* | 11/2016 | De Kock | A61N 1/057 |
| 2017/0042614 A1* | 2/2017 | Salahieh | A61B 1/00082 |
| 2018/0117331 A1* | 5/2018 | Kuzniecky | A61B 5/686 |
| 2018/0154140 A1* | 6/2018 | Bouton | A61B 5/251 |
| 2020/0069213 A1* | 3/2020 | Salo | A61N 1/048 |

OTHER PUBLICATIONS

PCT/US2019/044648 , "Invitation to Pay Additional Fees and, Where Applicable, Protest Fee", Oct. 11, 2019, 12 pages.

\* cited by examiner

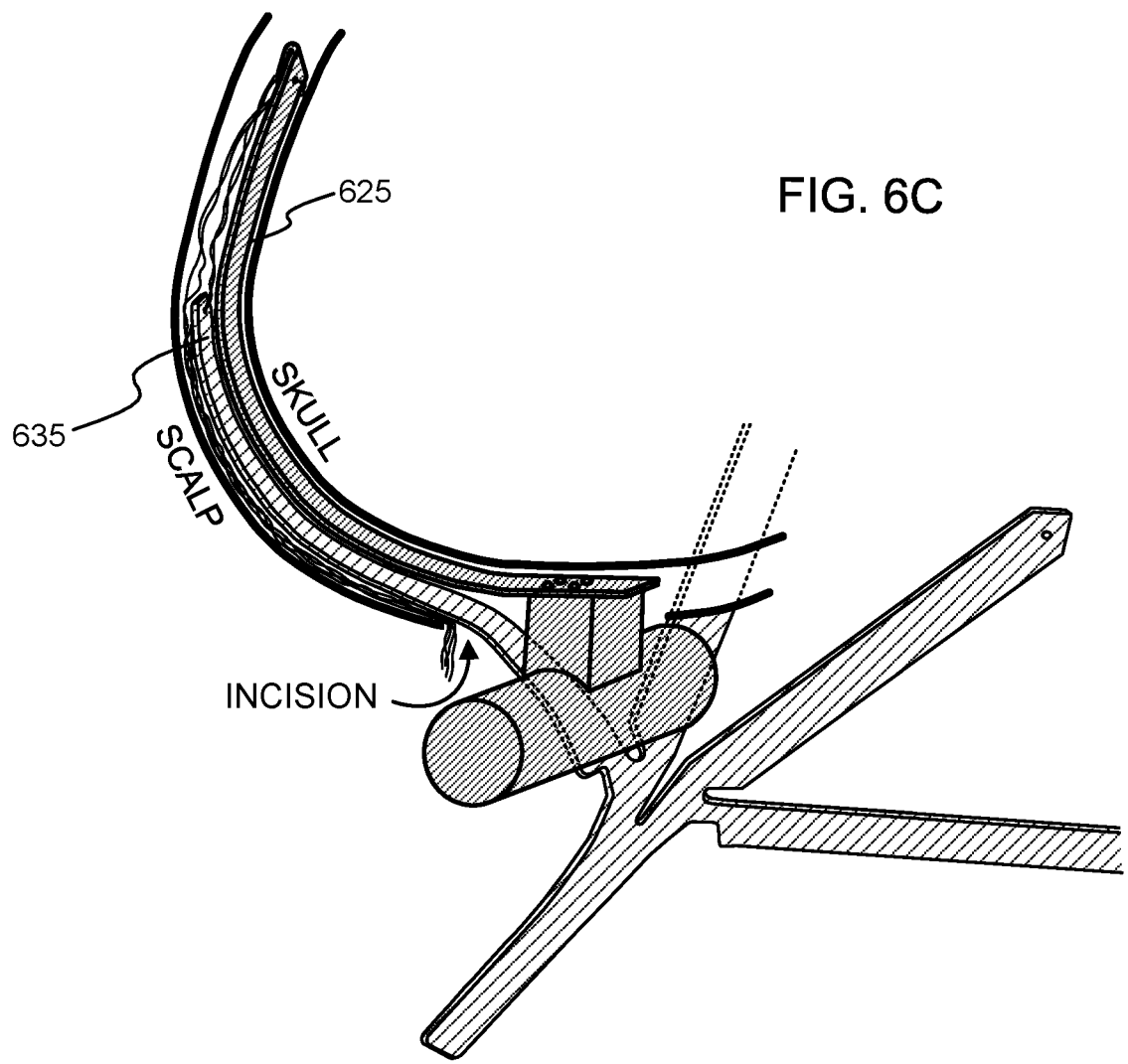

THIN-FILM HIGH-DENSITY SENSING ARRAY, SUB-SCALP IMPLANTATION TOOL AND IMPLANT METHOD

BACKGROUND

Neural recordings can be informative for diagnosis, assessment and/or treatment purposes. For example, some diseases (e.g., epilepsy) are associated with characteristic neural-activity signatures, such that observing such signatures can indicate that a corresponding diagnosis is to be made. As another example, EEG characteristics can be used to identify a stage of Alzheimer's disease. However, it can be difficult to collect high-quality and useful data. While external sensors can measure some neural signals, it is difficult to associate specific signals with particular brain regions. Invasive techniques, meanwhile, are often avoided by patients and physicians and—when used—are frequently used for rather short time intervals. Identification of tools and techniques to support chronic recordings of high precision would be advantageous.

SUMMARY

In some embodiments, an implant device is provided that includes a central section, a set of electrodes, and a set of branch portions. With regard to each branch portion of the set branch portions, a first end of the branch portion is connected to the central section, and the branch portion includes a subset of the set of electrodes. Each electrode in the subset can be disposed on a bottom surface of the branch portion, wherein the subset of the set of electrodes includes three or more electrodes. With regard to each branch portion of the set branch portions, the branch portion includes multiple vias that extend from the bottom surface of the branch portion to a top surface of the branch portion, and at least one electrical trace is disposed on the top surface of the branch portion. The multiple vias can electrically connect each of the subset of the set of electrodes to the at least one electrical trace.

In some embodiments, a method is provided that includes positioning an implant device to (e.g., under or below the scalp) to collect neural recordings from a person. The implant device can be activated so as to trigger collecting voltage signals at the set of electrodes and outputting (e.g., wirelessly transmitting) neural-recording signals that correspond to the voltage signals. The neural-recording signals can be accessed at an electronic device.

In some embodiments, a sub-scalp implantation tool is provided that includes a curved arm configured in a curved shape. In some instances, the sub-scalp implantation tool includes a handle component, and the curved arm can be connected to the handle component at a first end and extend away from the handle component to a second end of the curved arm. The curved arm can be configured in a curved shape. An end portion of the curved arm can include a hole. The end portion can include a portion of the curved arm adjacent to the second end.

In some embodiments, a method is provided that includes connecting a sub-scalp implantation tool to an implant device by threading a suture through a first hole in a curved arm of the sub-scalp implantation tool and through a second hole in a branch portion of the implant device. (It will be appreciated that the implantation tool may be alternatively or additionally used to move through and/or anchor within the subgaleal space or a more superficial plane.) While the suture is relaxed, the sub-scalp implantation tool can be moved through an incision and through a sub-scalp space that is between a skull and a scalp to a target position. Subsequent to the movement, an end of the branch portion of the implant device can be inserted through the incision and one or both ends of the suture can be pulled. The pulling can cause the implant device to move through the sub-scalp space to the target position.

BRIEF DESCRIPTION OF THE DRAWINGS

Illustrative embodiments of the present invention are described in detail below with reference to the following drawing figures:

FIGS. 6A-6F illustrate stages during an implantation an implant device according to an embodiment of the invention.

DESCRIPTION

Figure 1:
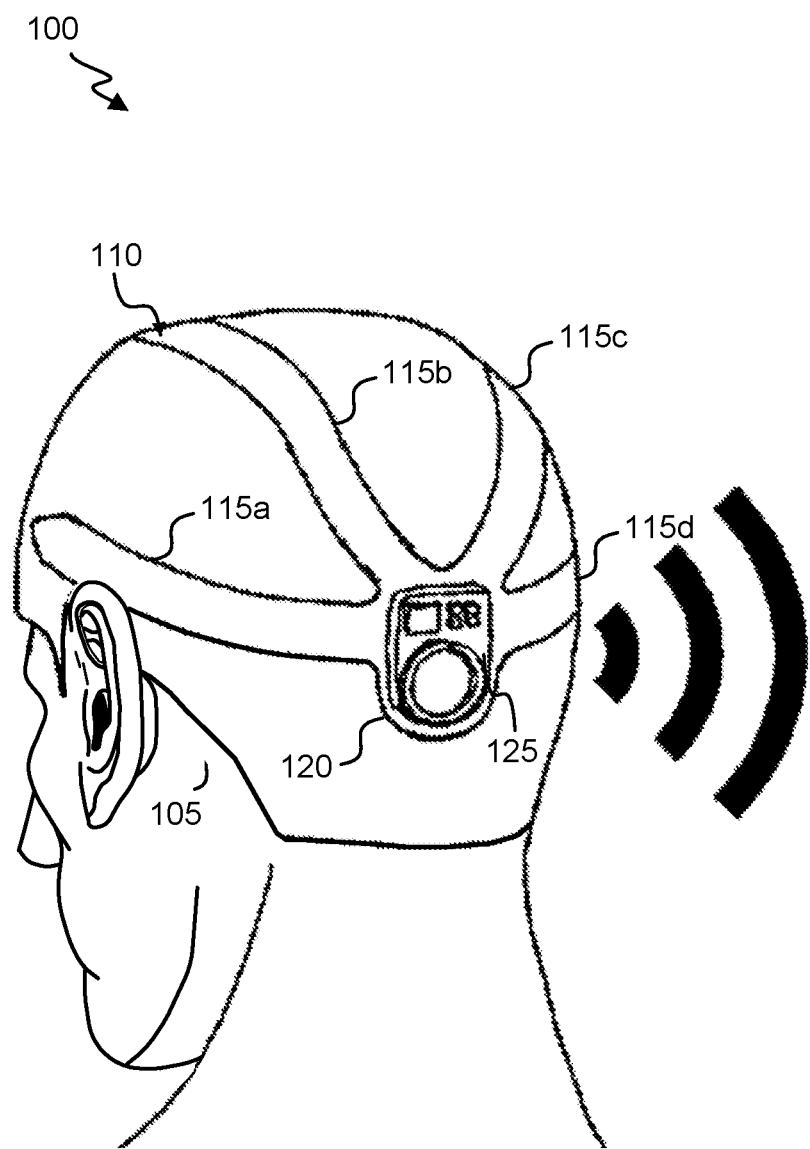
FIG. 1 shows a recording system according to an embodiment of the invention.

In some embodiments, devices, systems and techniques are provided to facilitate chronic monitoring of biological signals. The monitoring can include recording of neural activity (e.g., from populations of neurons). An implant device can be configured to have multiple flexible branch portions—each of which supports multiple electrodes. The electrodes can be disposed on a bottom side of the branch portions. Each electrode can be connected by an electrical via to a trace on a top side of the branch portion. The trace can be disposed to be shaped in a wave shape, such that successively connected electrodes are near opposite sides of the branch portion. Each trace can be connected to electronics present on the top side of the implant device, such that signals recorded at the electrodes are availed to the electronics. The electronics can (for example) multiplex the signals and/or transmit the (processed or unprocessed) signals to an electronic device (e.g., a wearable electronic device or remote electronic device). For example, the signals can be wirelessly transmitted to the electronic device. Each of the branch portions can include a hole in a distal portion of the branch portion. The hole can have a diameter that is (for example) less than 2.00 mm and can be positioned to be within 2 cm of a distal edge of the branch portion.

In some embodiments, an implantation tool is provided that includes a curved arm and (optionally) a handle. The curved arm can (for example) can be configured to have a radius that (e.g., continuously) decreases across a length of the arm as it extends from a proximate edge connected to (or near) the handle to a distal edge. The curved arm can be comprised of metal. A distal portion of the curved arm can include a hole. The hole can have a radius that is (for example) less than 0.5 mm and can be positioned to be within 2 cm of a distal edge of the curved arm.

In some embodiments, techniques are provided for using devices for recording neural activity. An implantation tool can be connected to an implant device with a flexible connector, such as a suture. For example, each of the implantation tool and the implant device can include a connecting area (e.g., a hole) through which the flexible connector (e.g., a suture) can connect. The connector can connect to the connecting area by (for example) threading the connector through a hole in each of the implantation tool and the implant device. The threading can thus result in a bight of suture (doubled over suture) having a midpoint (e.g., an approximate half point) at a distal end of the implant device. The implantation tool can be inserted through an incision and advanced to a target destination while the connector is relaxed. The implantation tool can then be held directly in place via pressure through the skin at the target destination while the connector is tightened such that the implant device is advanced to the target destination via a presence of tensile force resulting from the tightening. In some instances, connective tissue separates the target destination from the incision; rigidity of the implantation tool can thus enable the implantation tool to move from the incision to the target destination, whereas the at least partial flexibility of the implant device may have impeded such movement. Coupling the devices via the suture may facilitate positioning the implant device (which can include positioning a component of the implant device) in a desired location.

FIG. 1 shows a recording system 100 according to an embodiment of the invention. An internal view of a portion 105 of a person's head is shown. The internal view can be a view corresponding to a sub-scalp space that is between a scalp and skull of the person.

An implant device 110 has been positioned, with four branch portions 115a-d extending in different directions from a central section 120. Each branch portion 115a-d can be configured to collect neural signals from deeper brain regions. Branch portions 115a-d can route the signals to electronics 125 disposed at central section 120. Electronics 125 can, in some instances, process the data (e.g., to multiplex signals). Central section 120 can include a wireless transmitter to transmit the (processed or unprocessed) signals through the scalp, such as the subgaleal or more superficial layer.

Figure 2A:
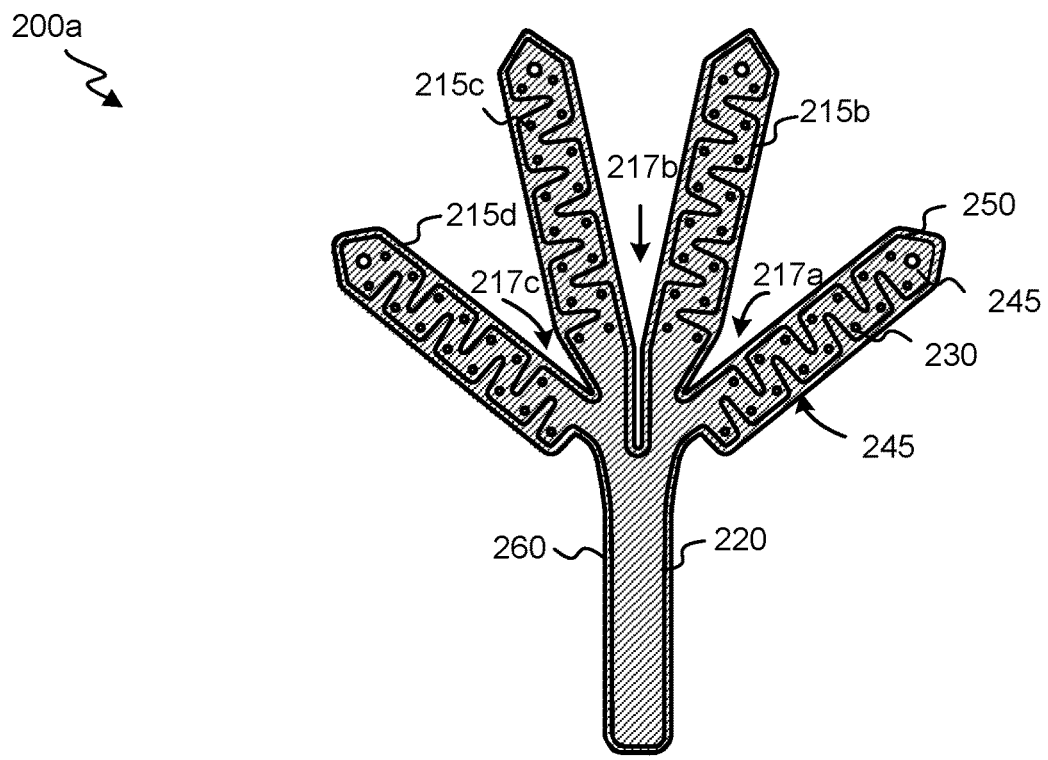
FIGS. 2A and 2B show views of an implant device according to an embodiment of the invention.
Figure 2B:
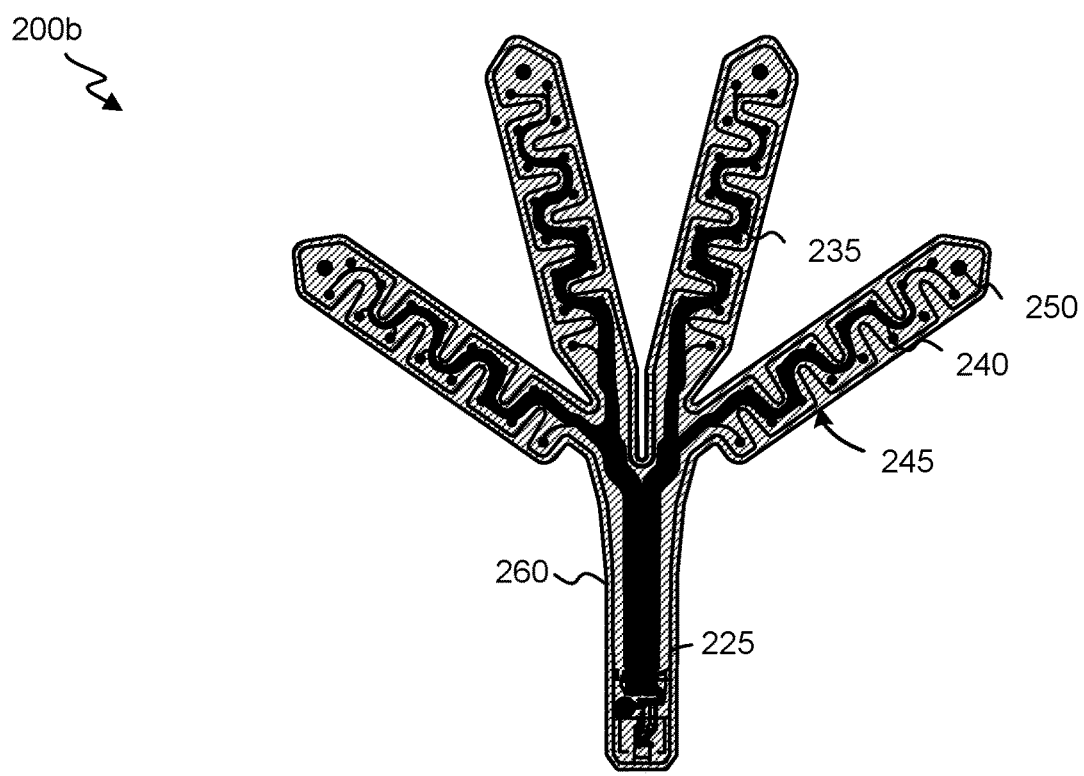

FIGS. 2A and 2B show views of an implant device according to an embodiment of the invention. FIG. 2A shows a bottom side 200a of the implant device. Thus, the left-to-right order of branch portions 215a-d is opposite as compared to the left-to-right order of branch portions 115a-d shown in FIG. 1.

A first branch portion 215a is separated from a second branch portion 215b by a first separation space 217a. Second branch portion 215b is separated from a third branch portion 215c by a second separation space 217b. Third branch portion 215c is separated from a fourth branch portion 215d by a third separation space 217c. Second separation space 217b can be deeper than first separation space 217a and/or third separation space 217c. In the depicted instance, second separation space forms a groove near a central section 220.

Separation spaces 217a-217c can enhance a flexibility of the implant device and/or enhance a degree to which the implant device can be laterally folded or rolled (e.g., during a positioning process). Further, separation spaces 217a-217c can allow the implant device to be positioned while avoiding contact with specific anatomical structures. For example, when the implant device is positioned in a sub-scalp space of a person, first separation space 217a and third separation space 217c can be aligned with the person's ear muscles, such that adjacent branch portions do not contact the ear muscles. Further, second separation space 217b can be aligned with the person's eye sockets, such that adjacent branch portions do not contact the eye sockets.

A set of electrodes 230 are disposed across branch portions 215a-d. Set of electrodes 230 can include (for example) approximately or at least 16, 32, 64 or 128 electrodes. Each electrode may be (for example) at least, approximately or less than 0.5 mm, 1 mm, 2 mm, 3 mm or 5 mm (e.g., 2 mm-5 mm). In the depicted instance, at each branch, a subset of set of electrodes 230 are arranged along two lines: one near a left side of the branch and one near a right side of the branch.

At each branch portion, each electrode disposed on bottom side 200a can be connected to an electrical trace 235 disposed on a top side 200b of the implant device. FIG. 2B shows top side 200b. For example, each electrode can be connected to a via 240 (e.g., that is directly adjacent to the electrode) that extends through the implant device. FIG. 2B shows depictions of vias 240 at top side 200b. It will be appreciated that the vias are also present on bottom side 200a, but the proximity of the vias to the electrodes can obscure their visual representation in FIG. 2A. In some instances, vias can be positioned through or underneath electrodes. However, positioning the vias directly adjacent to the electrodes can provide better signal-to-noise ratios.

Due to the inclusion of vias, the implant device may be free of slots.

Trace 235 can run between the two lines along which the electrodes are disposed, such that trace can be disposed in a wave shape. Trace 235 can have a width that is (for example) at least, about or less than 0.02 mm, 0.03 mm, 0.05 mm, or 0.1 mm (e.g., 0.03-0.1 mm). An alternating- and/or wave-shape of trace 235 can reduce electrode coupling and increase signal-to-noise ratios as compared to a trace that would linearly connect electrodes. Further, the alternating- and/or wave-shape of trace 235 can improve an effective resilience and/or mechanical stability of the trace. Thus, when a branch portion encounters or is pushed into biological material (e.g., connective tissue), trace 235 may be less likely to buckle and/or break when in the alternating- and/or wave-shape of the trace shape as compared to a linear shape.

Each branch 215 can include a set of indentions 245 in between electrodes on each of the lines. Indentions 245 can reduce electrode coupling and can increase signal-to-noise ratios. Further, each branch can include a hole 250 near an end of the branch. Hole 250 can be used to (for example) thread a suture. The implant device can be covered with a coating layer 260. The coating can be configured such that indentations 245 are not visible through coating layer 260, but such that separation spaces 217a-c remain visible.

Figure 3:
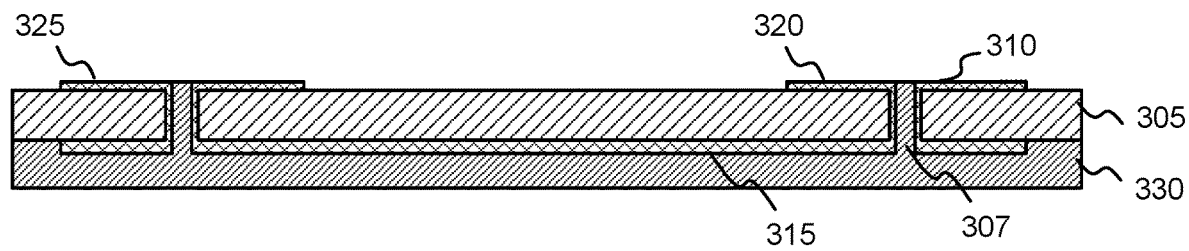
FIG. 3 shows a stack included in an implant device according to an embodiment of the invention.

FIG. 3 shows a stack 300 included in an implant device according to an embodiment of the invention. Stack 300 includes a thin-film substrate 305 (e.g., that comprises a dielectric material, such as polyurethane, poly(ether ether ketone) (PEEK) or a high-melting point liquid crystal polymer (LCP)). Holes for vias 307 can be formed through thin-film substrate 305. Control of a manufacturing process can be established to have a finished hole tolerance of 0.1 mm. The holes can have a diameter that is approximately 0.3 mm.

Thin-film substrate 305 can then be metallized. The metallization can include (for example) metallizing the substrate with a thin titanium layer (e.g., having a thickness less than about 1 µm, 2 µm or 5 µm) followed by a gold with adhesion layer 310. The metallization can convert the holes to electric vias. Further, precise fabrication of the metallization can allow an electric trace 315 and bond pads 320 to be formed. Electrodes 325, electronics (e.g., an integrated circuit included at a central section that has a size of approximately 7 mm by 4 mm) and/or passive components can be bonded to bond pads 320. Bond pads 320 can have a thickness that is (for example) at least 10 µm. An encapsulation layer 330 can be deposited so as to be positioned below trace 315. Encapsulation layer 330 can include (for example) a low-melting-point LCP. Thus, it can be formed without compromising other components of stack 300.

While not shown, silicone can then be sputtered on both sides of stack 300, so as to form a thin silicone layer (e.g., less than 300 microns or less than 500 microns). A mask can be used during the sputtering such that the silicone does not cover the electrodes. A height of stack 300 can be less than (for example) 0.5 mm or 0.3 mm. The thinness of stack 300 can enable it to be positioned within a sub-scalp space, It will be appreciated that, while in use, stack 300 may be upside-down relative to the depiction in FIG. 3, such that electrodes are on a side of stack 300 that is closer to a person's brain.

An implant device disclosed herein can be positioned in a sub-scalp space to collect recordings. One technique to position the device is to expose a large area of a person's skull, such as an area that is greater than a surface area of the implant device. The device can then be positioned on the person's skull. However, this technique is heavily invasive and would likely only be used for short-term and/or acute recordings. Another approach is to make smaller incisions in a person's scalp and to move the implant device through the incision(s) and through a sub-scalp region to one or more target positions. A difficulty with this approach is that the sub-scalp region can include connective tissue, which can impede moving a flexible implant device to a target location.

Figure 4:
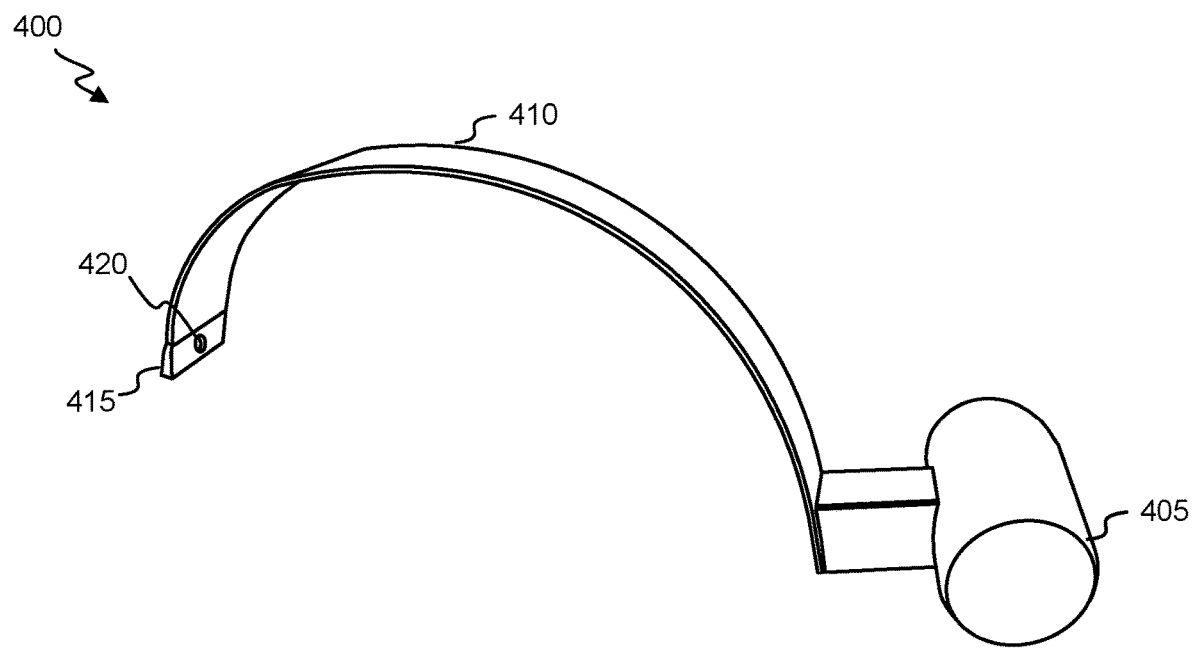
FIG. 4 shows an implantation tool according to an embodiment of the invention.

Thus, in some embodiments, an implantation tool is provided that can be used to create a path between an incision and a target position and/or can serve as an anchor once at a target position that can be used to direct movement of an implant device. FIG. 4 shows an implantation tool 400 according to an embodiment of the invention. Implantation tool 400 may (but need not include a handle 405. In this instance, handle 405 is shaped in a T-shape, which can allow a user to (for example) position one or more fingers around a left side of a top of the T shape and one or more other fingers around a right side of the top of the T shape. It will be appreciated that other handle designs (e.g., a single knob) are also contemplated and, in some instances, implantation tool 400 does not include a handle Handle 405 is attached to a curved arm 410. Curved arm 410 can be shaped to have a radius that changes across a length of the arm. A radius of a first portion of curved arm 410 that is closer to handle 405 can be larger than a radius of a second portion of curved arm 410 that is further from handle 405. Thus, the curve may be tighter and more substantial near a distal edge of curved arm 410 relative to a proximate edge by handle 405.

Curved arm 410 can be composed of a rigid material. Curved arm 410 can be metallic and comprise metal. Curved arm 410 can have a width that is (for example) at least 5 mm or 1 cm and/or that is less than 5 cm, 4 cm or 3 cm. Curved arm 410 can have a length that is (for example) at least 2 inches, 3 inches or 5 inches and/or that is less than 15 inches, 10 inches or 8 inches.

A distal end of curved arm 410 can include an atraumatic tip 415, which can include a tip that is thicker than (for example) a portion of curved arm 410 that is in the middle between the distal and proximate ends of curved arm 410. Atraumatic tip 415 can be formed (for example) by bending an end of a strip used to form curved arm 410 over on itself.

A distal end of curved arm 410 can also include a hole 420. Hole 420 may be in atraumatic tip 415 or can be more central than atraumatic tip 415. In some instances, a suture can be threaded through hole 420 and also attached to an implant device, such that the implant device can be pulled towards the implantation tool.

Figure 5:
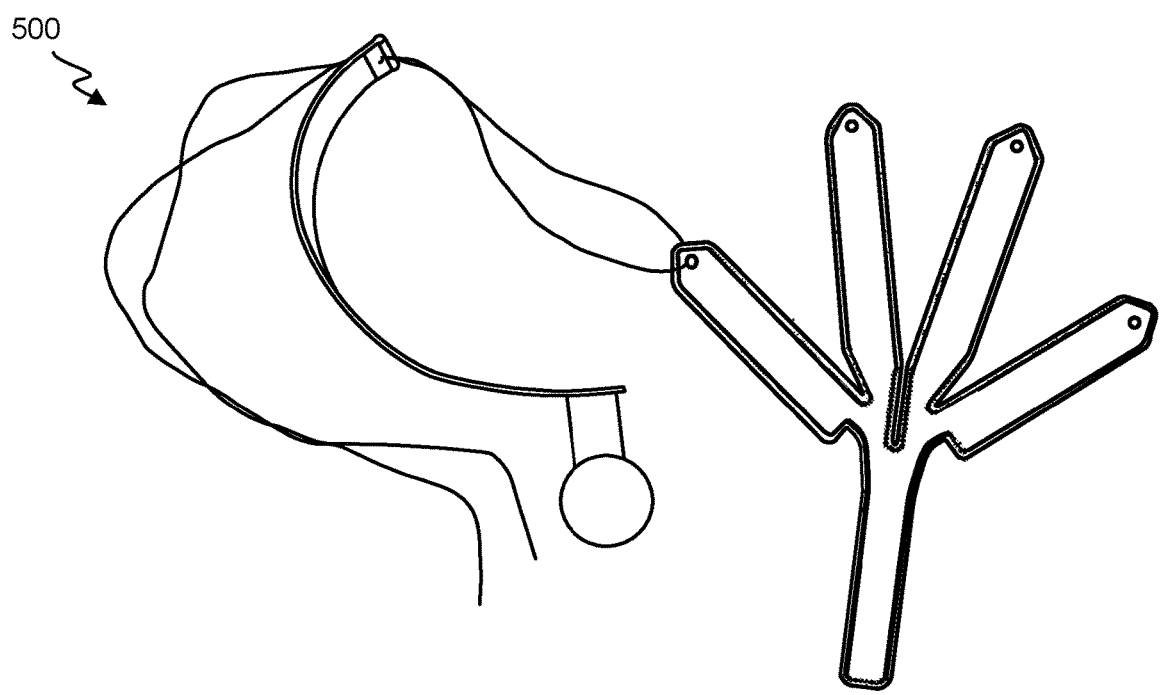
FIG. 5 shows an implant system according to an embodiment of the invention.

FIG. 5 shows an implant system 500 according to an embodiment of the invention. In this instance, a suture has been threaded through a hole in a distal edge of the curved arm of an implantation tool. The suture is then threaded through a hole is a distal edge of a branch portion of an implant device and then threaded back through the hole in the implantation tool. Thus, if and/or when the ends of the sutures are pulled while the implantation tool is stabilized in position, the implant device will move towards the distal edge of the implantation tool.

Figure 6A:
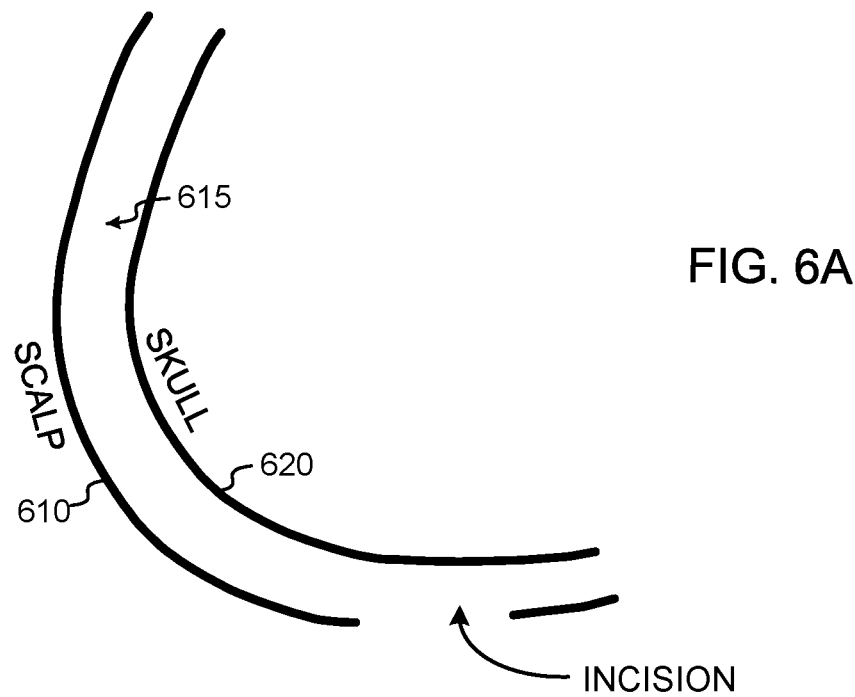

FIGS. 6A-6F illustrate a stages during an implantation an implant device according to an embodiment of the invention. FIG. 6A shows an incision 605 made in a scalp 610 of a person. Incision 605 leads to a sub-scalp space 615 that is between scalp 610 and a skull 620. Incision 605 can extend across part of the midline. In some instances, the incision extends downwards from or is below the occipital ridge. The incision may be (for example) at least 0.5 inch, at least 1 inch, less than 5 inches, less than 3 inches or less than 2 inches.

Figure 6B:
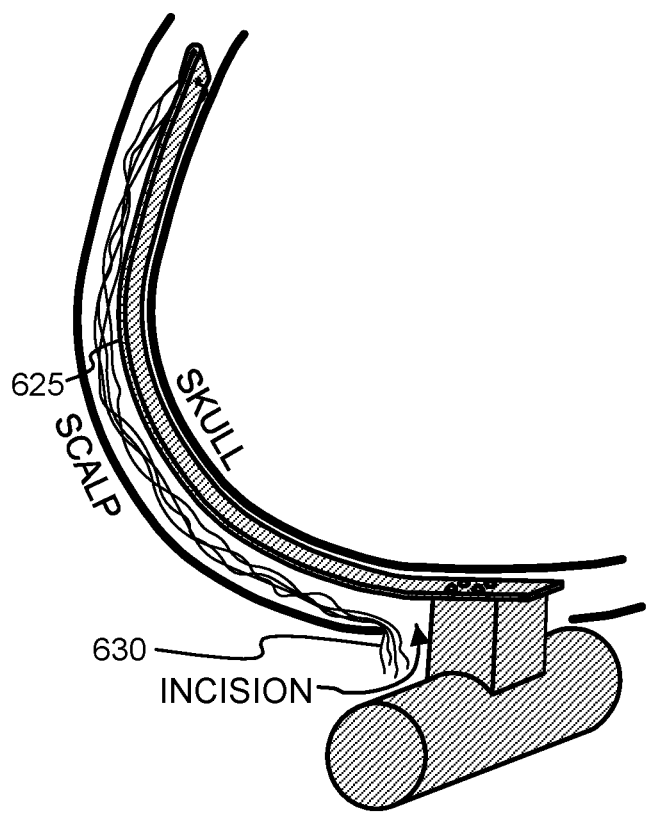

As shown in FIG. 6B, an implantation tool 625 can be inserted through incision 605. Using a handle of implantation tool 625, a user can guide and maneuver implantation tool 625 through sub-scalp space 615 towards a target destination. A curved arm of implantation tool 625 can be sufficiently long such that the handle of implantation tool 625 can remain outside the person when the distal edge of the arm has reached the target destination.

A target destination can correspond to a set of stereotactic coordinates and/or predefined distances from one or more anatomical structures. Guiding implantation tool 625 can include pushing an atraumatic tip of implantation tool 625 across skull 620. A user may be able to visually see impressions protruding from scalp 610 that are made by movement of implantation tool 625. Thus, the user may be able to determine whether implantation tool 625 is moving in a target manner and/or has reached its target destination.

Figure 6D:
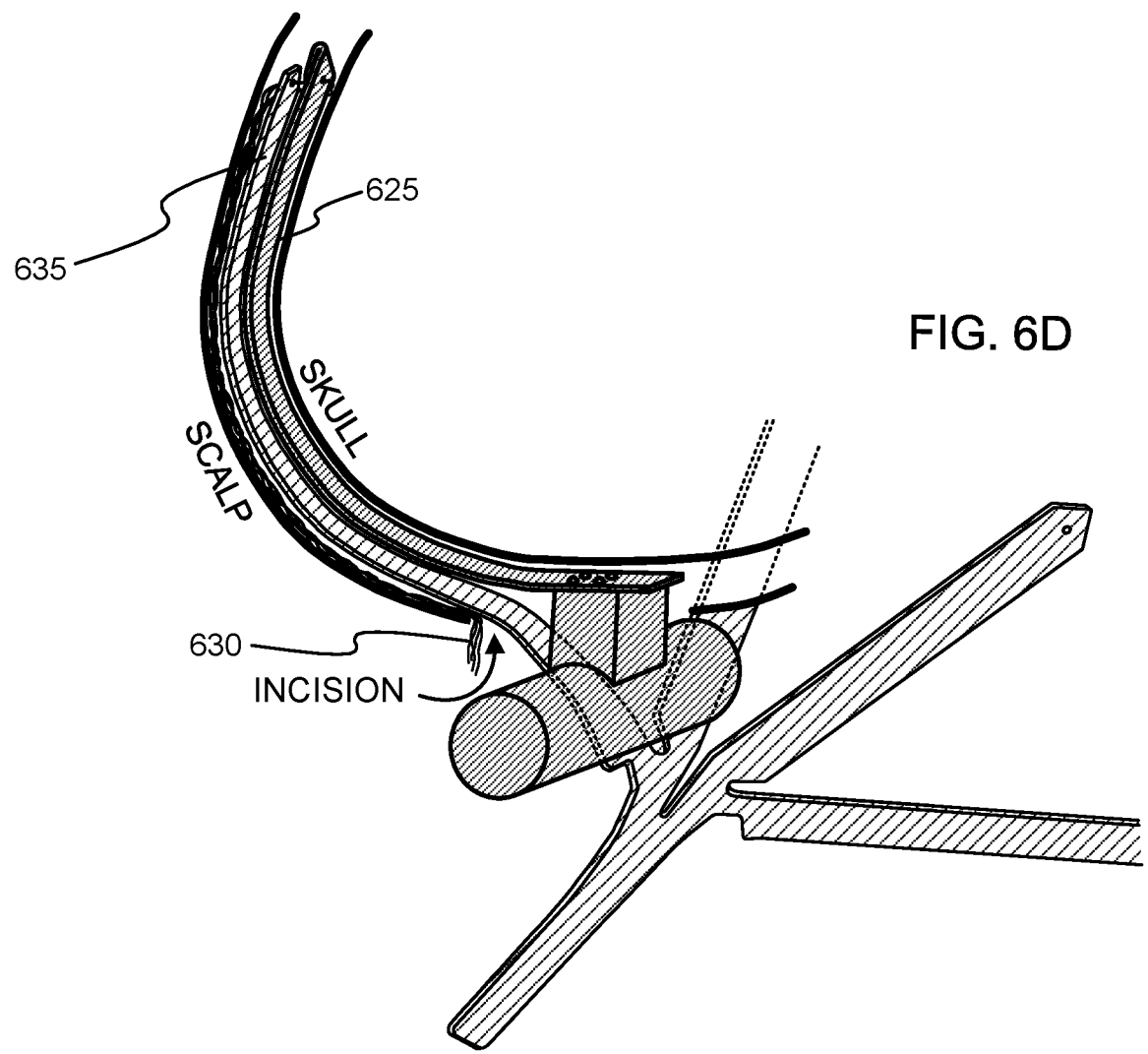

A suture 630 can be threaded through a hole in a distal edge of implantation tool 625. Suture 630 can also be looped through a hole in a branch portion of an implant device 635, in a manner such as shown in FIG. 5. Thus, when a user pulls edges of suture 630 (and when a distal edge of the branch portion has been inserted into incision 605), the branch portion of implant device 635 can advance towards the hole in implantation tool 625. (FIG. 6C.) It will be appreciated that the portion of suture 630 that is contacted for pulling can be outside the person. A user can continue to pull suture 630 until the branch portion of implant device 635 reaches the target destination. (FIG. 6D.)

Figure 6E:
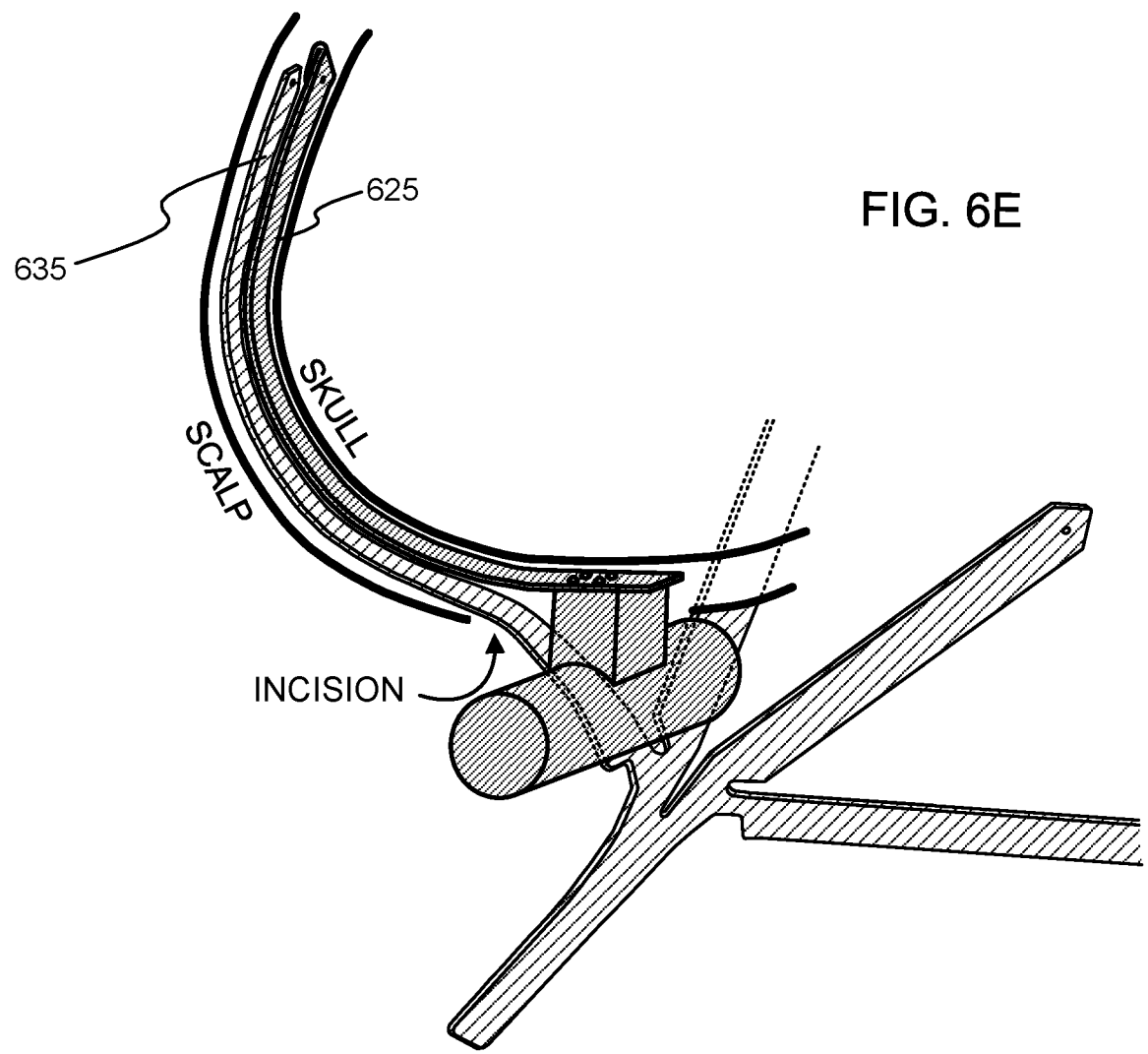

A user can then cut suture 630. The portion of suture 630 that is cut can be outside the person. Implant device 635 can be stabilized so as to prevent or impede implant device 635 from moving. The stabilization can include applying pressure to the distal edge of the implant device 635 by pushing a finger on a part of the scalp aligned with a position of the distal edge. The suture can then be withdrawn. (FIG. 6E.) For example, a user can pull a single edge of suture 630 such that it dethreads from the holes in the branch portions of implant device 635 and implantation tool 625.

Figure 6F:
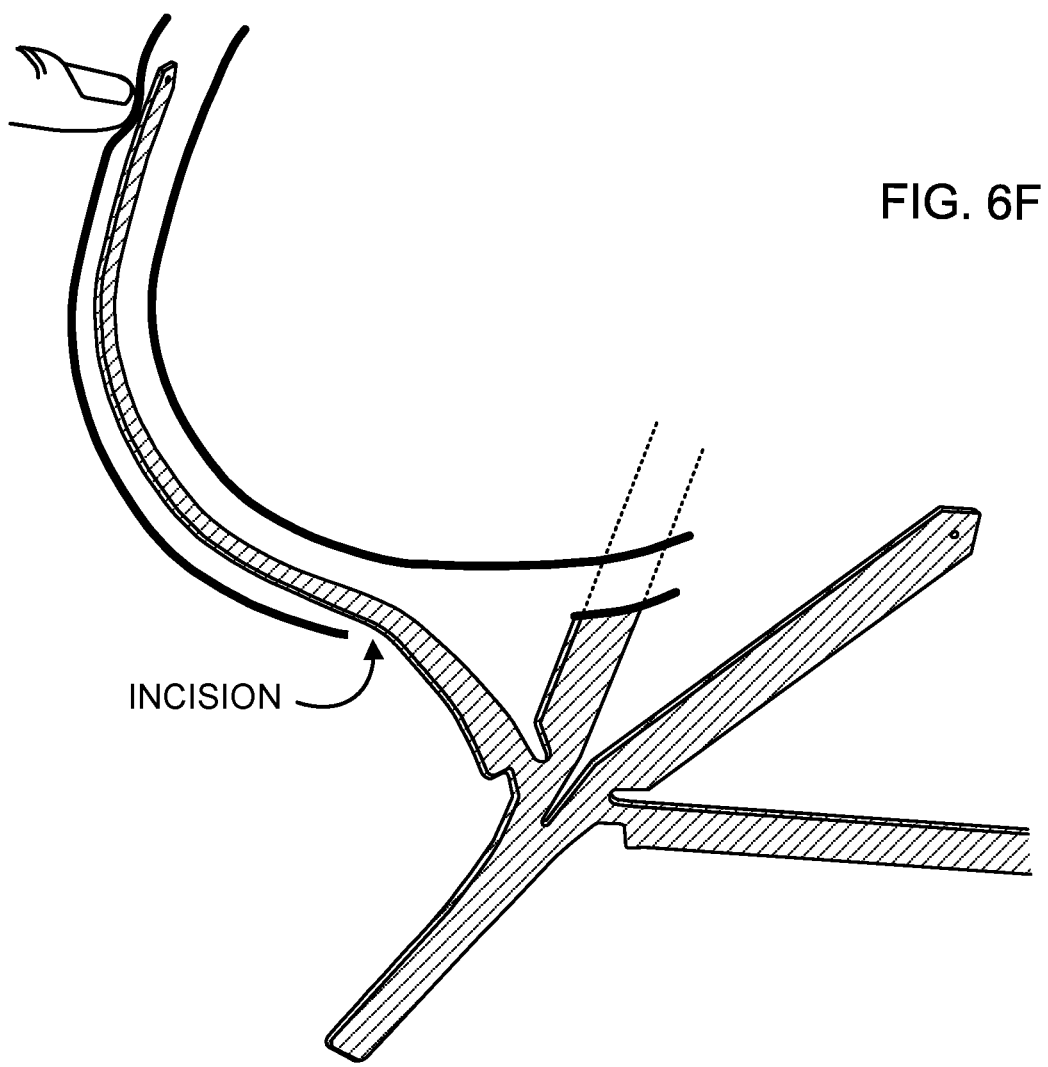

While implant device 635 is stabilized, implantation tool 625 can be withdrawn from sub-scalp space 615 by pulling on the tool's handle. Implant device 635 can remain at a target position in sub-scalp space 615. (FIG. 6F.) Implantation tool 625 can be used in a similar manner to position other branch portions of implant device 635. Incision 605 can then be closed, such that implant device 635 can serve as a chronic implant.

Figure 7:
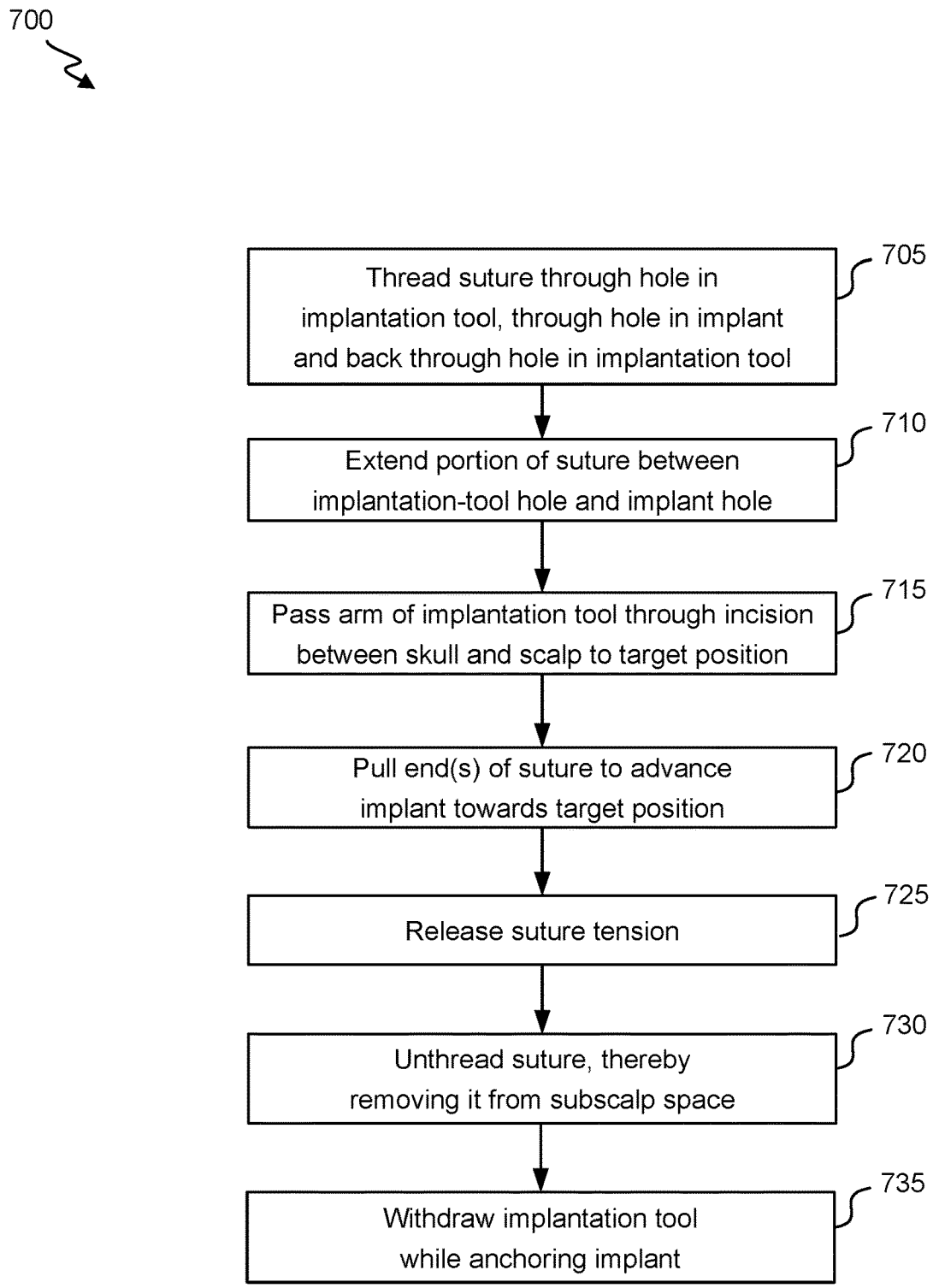
FIG. 7 illustrates a process for implanting an implant device according to an embodiment of the invention.

FIG. 7 illustrates a process 700 for implanting an implant device according to an embodiment of the invention. Process 700 begins at block 705 where a suture is threaded through a hole in an implantation tool, then through a hole in an implant device (e.g., the hole being at a distal edge of a branch portion) and then back through the hole in the implantation tool. At block 710, a portion of the suture that is between the implantation-tool hole and the implant-device hold is extended.

At block 715, a distal edge of the implantation tool is passed through an incision in a person's scalp and moved through the sub-scalp space to a target position. In some instances, the edge of the tool (and then the arm of the tool) is moved through a portion of the subgaleal space or another plane. The extension of the suture can allow the implantation tool to be moved through a person's sub-scalp space while causing relatively little movement to the implant device. The distal edge of the implantation tool can be stabilized while—at block 720—one or both ends of the suture are pulled. If a single edge is pulled, the other edge may be stabilized at this time to prevent unthreading of the implantation tool. Pull the suture end(s) can cause at least part of the implant device (e.g., a distal edge of a branch portion of the implant device) to advance towards the target position. The suture can be pulled while a force or pressure is exerted on the tool to resist movement of the tool.

At block 725, suture tension is released. At block 730, the suture is unthreaded from the implant device (e.g., by pulling on one edge of the suture). The suture can thus be completed removed from the sub-scalp space and head of the person. At block 735, the implantation tool can be withdrawn from the sub-scalp space and incision while the implant device is anchored (e.g., by exerting pressure on a distal edge of the positioned branch portion.

As previously disclosed, one technique for tethering and pulling an implant device to an implantation tool is to thread a suture through the hole in a branch portion of the implant device and (between threading the suture through a hole in the implant device and threading the suture back through the hole in the implant device), as illustrated in FIG. 5. In this instance, sutures may be rather long. For example, a suture may have a length that is at least twice at long (or at least 2.3 or 2.5 times as long) as a length between an incision and a target destination (for a position of at an end of a branch portion), at least twice at long (or at least 2.3 or 2.5 times as long) as a length of a curved arm of an implantation tool, at least 15 inches or at least 20 inches. Further, a different suture may be used for each branch portion of an implant device. Thus, using a technique as shown in FIG. 5 can result in a configuration that includes a large combined length of suture.

Figure 8A:
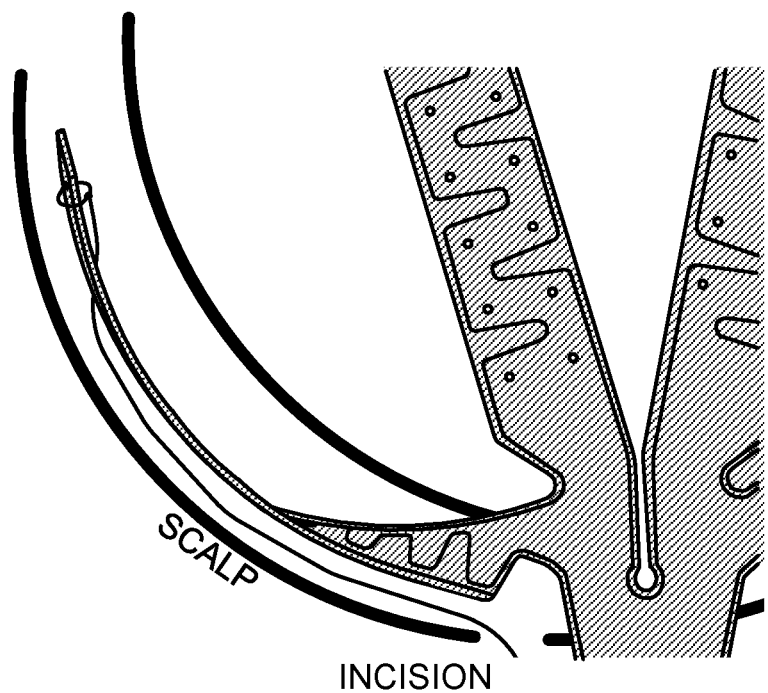
FIGS. 8A-8B illustrate stages during an implantation an implant device according to an embodiment of the invention.
Figure 8B:
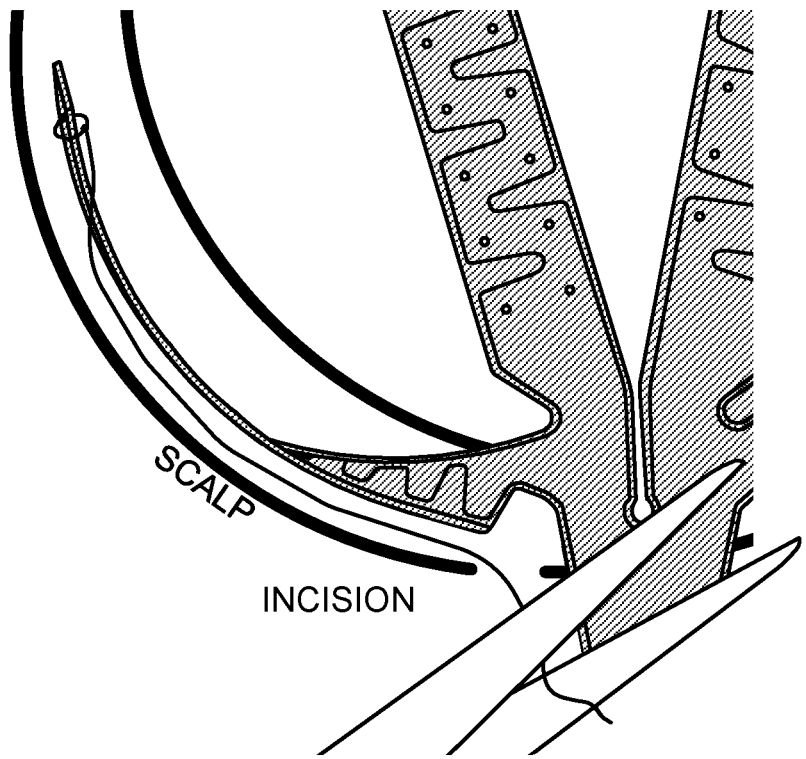

FIGS. 8A-8B illustrate an alternative technique for positioning an implant device in a person's sub-scalp space. This alternative technique can use less suture as compared to (for example) a technique using the configuration shown in FIG. 5. In this instance, a suture can be threaded through a hole in a curved arm of an implantation tool and then affixed to a branch portion of an implant device (or affixing a suture to a branch portion of an implant device and then threading the suture through a hole in a curved arm of an implantation tool. The affixing can include threading the suture through a hole in the branch portion and then tying the suture in a knot. (FIG. 8A.) Once the implantation tool is positioned at a target position and a distal edge of the branch portion is inserted into the incision, an edge of the sutured that is opposite to the affixed side can be pulled (while the implantation tool is stabilized to inhibit movement). This can cause the affixed portion of the suture to be pulled towards the hole in the implantation tool. The suture can then be cut at a position that is outside of the person's head. (FIG. 8B.) The portion of the suture that extends between the affixed end and the cut can remain in the person's head so long as the implant device remains implanted. A user (e.g., surgeon) may position (e.g., tuck) the cut end of the portion of the suture that remains attached to the implant device underneath a user's scalp before closing an incision.

Figure 9:
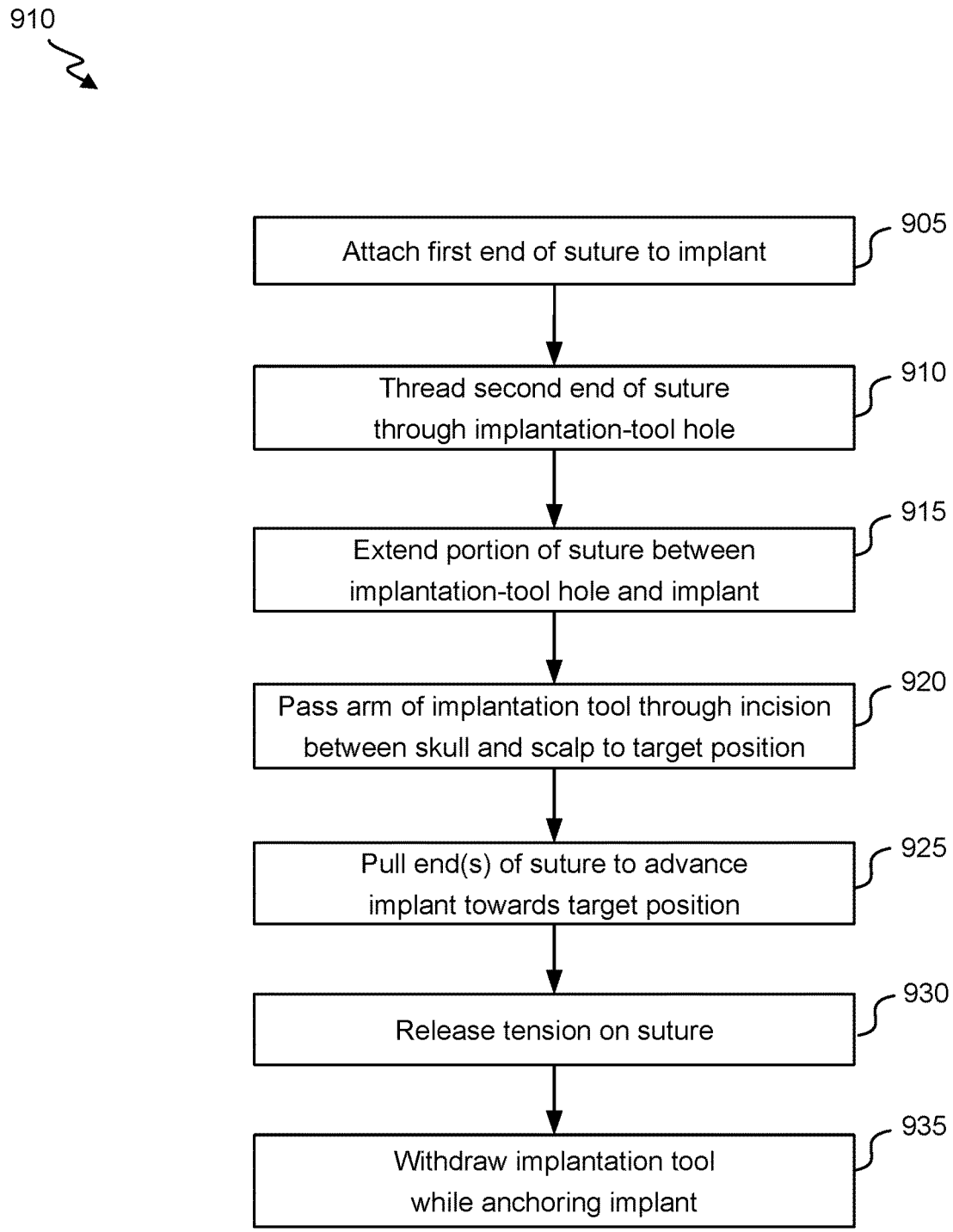
FIG. 9 illustrates a process for implanting an implant device according to an embodiment of the invention.

FIG. 9 illustrates a process 900 for implanting an implant device according to an embodiment of the invention. Process 900 begins at block 905 where a first end of a suture (e.g., a sterilized suture) is attached to an implant device (e.g., to a distal part of a branch portion of the implant device). The attaching can include threading a suture through a hole in a branch portion of the implant and tying the suture to the branch portion.

At block 910, an opposite end of the suture is threaded through a hole in an implantation tool. It will be appreciated that blocks 905 and 910 may be performed in reverse order. At block 915, a portion of the suture that is between the part of the suture threaded in the implantation-tool hole and the part of the suture attached to the device is extended to be at least as long as a distance between an incision location and a target location. In some instances, blocks 905 and/or 910 can be performed while maintaining a sufficient length between the attachment site and the threaded site, such that block 915 can be omitted.

At block 920, the curved arm of the implantation tool is passed through an incision made in a scalp of a person and through a sub-scalp space of the person to a target position. When the tool is positioned, a distal edge of the branch portion that has the suture attached can be inserted into the incision. At block 925, the non-attached end of the suture (which may have been controlled so as to remain outside of the person) can be pulled while the implantation tool is stabilized to inhibit or prevent movement. The pulling can cause the attached end of the suture, and thus the distal edge of the branch portion to move towards the attached suture and thus towards the target position.

At block 930, tension on the non-attached end of the suture can be released. At block 935, the implantation tool is withdrawn while the implant is anchored or stabilized (e.g., by a person exerting pressure on the branch portion through the scalp). Withdrawing the implantation tool can cause the tool to slide down the suture. When the tool has been fully withdrawn from the sub-scalp space and back through the incision, a user can trim the suture and tuck any remaining portion into the sub-scalp space. The incision can then be closed.

Figure 10:
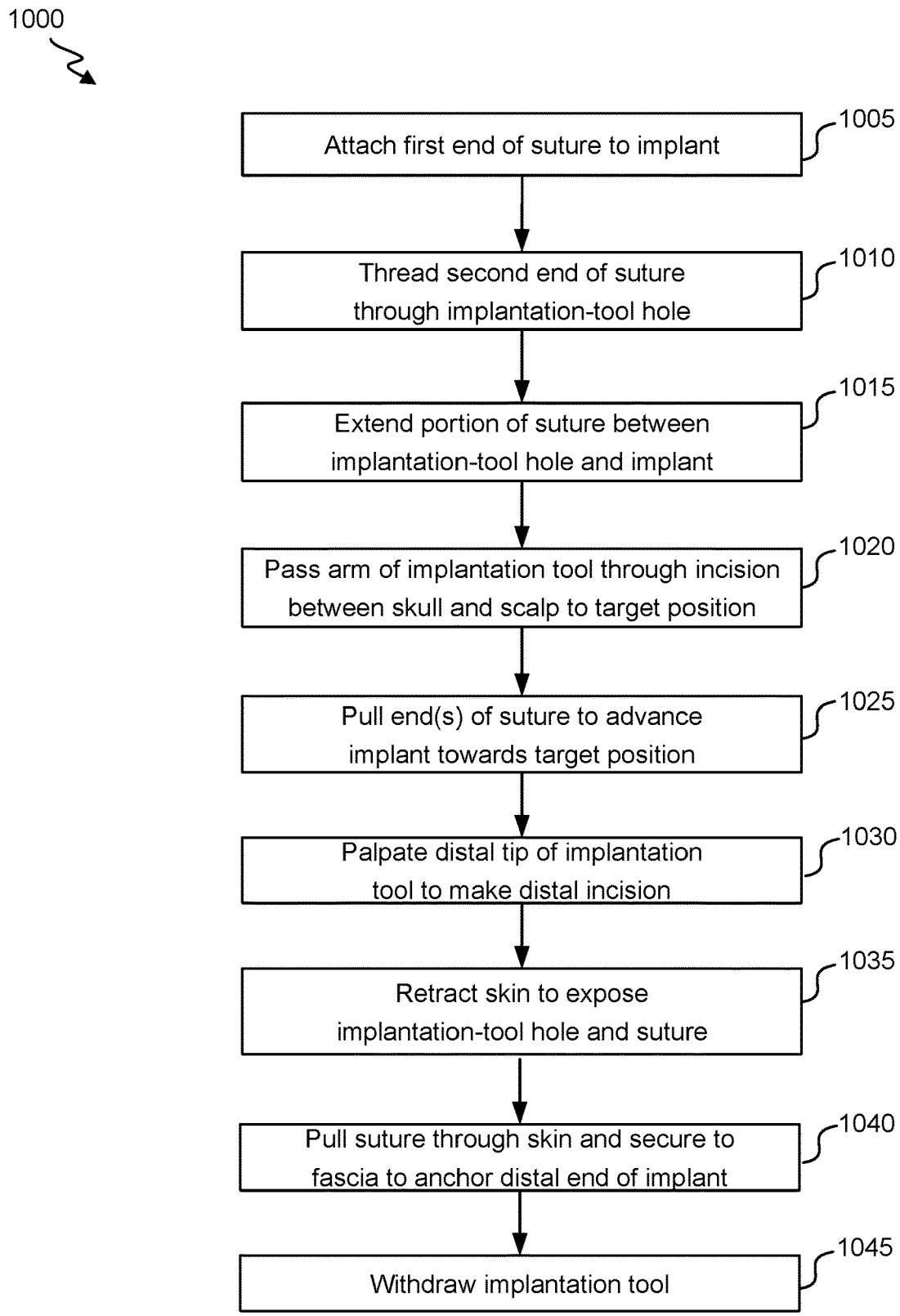
FIG. 10 illustrates a process for implanting an implant device according to an embodiment of the invention.

FIG. 10 illustrates a process 1000 for implanting an implant device according to an embodiment of the invention. Blocks 1005-1025 can correspond to blocks 905-925 from process 900. However, in process 1000, at block 1025, the arm of the implantation tool is palpated so as to make a distal incision. The palpating can be caused be a corresponding movement of the handle of the implantation tool. The palpating can be performed while the branch portion of the implant device is stabilized or anchored (e.g., by exerting pressure on the portion through the scalp). In some instances, the palpation need not cause a distal incision but may instead merely be sufficient to provide an indication through the scalp as to where a distal tip of the curved arm is positioned.

At block 1035, a user retracts skin from the distal incision so as to expose the hole in the implantation tool through which the suture was threaded at block 1010. At block 1040, a user (e.g., using surgical tools) can pull the suture through the scalp and secure it (e.g., via a stitch) to a portion of the scalp and/or fascia. Thus, the suture can be attached to the person at one end and attached to the branch portion at the other end. The suture can therefore tether the branch portion to an anatomical position of the person and may facilitate keeping the branch portion in a desired location and maintaining a desired type of neural recording.

At block 1040, the curved arm of the implantation tool is withdrawn from the sub-scalp space and from the incision. In some instances, the branch portion is stabilized during the withdrawal of the curved arm. In some instances, the implantation tool slides across part of the suture as it is withdrawn. In some instances, the suture is cut near the attachment to the scalp and/or fascia performed at block 1035. A remaining unattached portion of the suture can be withdrawn from the distal incision, and the implantation tool can then be unconnected to and/or free from the suture and freely withdrawn. Process 1000 can be repeated for each other branch portion of the implant device.

Figure 11:
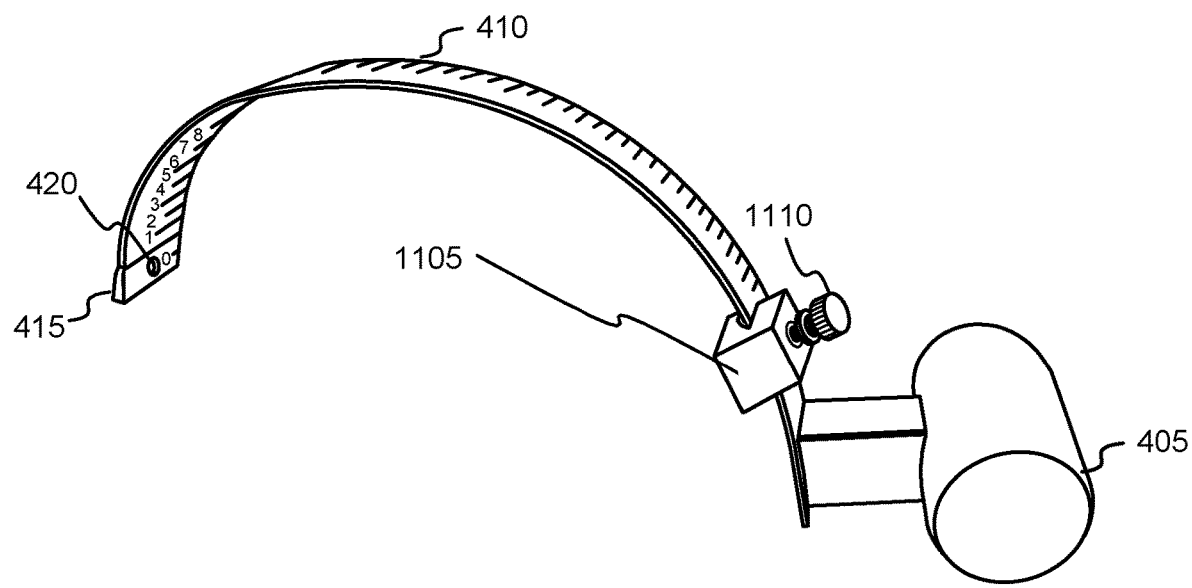
FIG. 11 illustrates a depth stop for an implantation tool according to an embodiment of the invention.

FIG. 11 illustrates a depth stop for an implantation tool according to an embodiment of the invention. A curved arm of an implantation tool can include markings that can identify a distance from a distal edge of the curved arm. A movable depth stop 1105 can be configured to slide across the curved arm. A position-locking component 1110 can be configured to engage movable depth stop 1105 in a manner that fixes a position of movable depth stop 1105. For example, position-locking component 1110 can include a screw that—when tightened—prevents movable depth stop 1105 from sliding along the curved arm.

A user can thus identify a position for depth stop 1105 based on dimensions of a person's head for which an implantation is to occur. Identifying the position can include identifying a target sub-scalp distance between an incision site and a target location for a distal edge of a branch portion of an implant device. The user can move depth stop 1105 to the position (e.g., so as to align the depth stop with a marking on the curved arm that corresponds to the target distance) while the position-locking component 1110 is in an unlocked state. Once depth stop 1105 is positioned at a desired position, the user can lock the position-locking component 1110 to prevent or inhibit further movement.

The user can then insert a distal edge of the implantation tool through an incision of the person and begin pushing the distal edge through the sub-scalp space. Once depth stop 1105 has met and/or contacted a scalp of the person adjacent to the incision, the user can discontinue maneuvering and/or pushing of the implant device. Thus, the depth stop can facilitate positioning the implantation tool at a desired location. The curved arm can be long enough to function across a range of head sizes, but the depth stop can inhibit or prevent the tool (and thus also an implant device) from extending beyond a target location.

It will be appreciated that disclosures herein are exemplary and that various alternative embodiments are contemplated. For example, insertion techniques and/or various medical-device characteristics can apply to a variety of implant devices. An implant device may lack a plurality of arms and/or branches. The implant device may have an extended non-branching configuration (e.g., that includes or is a tapered or untampered strip). The implant device may include a hole at an end of the device, which can facilitate use of an implantation tool and/or implantation technique disclosed herein.

The implant device can be configured to be flexible (and/or conforming) along one, more or all dimensions, such that it can bend to conform or to substantially conform to one or more surrounding structures (e.g., a skull) as it is being inserted to reach a target location. In some instances, the implant device has a default shape that is curved along a long axis (e.g., to facilitate moving the device in a direction of the long axis across the skull). The default shape can be fixed or a shape to which the device returns when contrary force on the device is released or relaxed. A flexible (and/or conforming) configuration and/or a curved default shape can facilitate implanting the device (and facilitate avoiding damage to the device) despite heterogeneity across a surface of the skull and adjacent incision contact as the device is being initially inserted through the scalp.

An implant device may, but need not, include (for example) one or more electrodes. The one or more electrodes can be configured to record electrical activity (e.g., neural signals). In some instances, the implant device is part of a closed-loop stimulation system. The closed-loop stimulation system can further include one or more drug-delivery components and/or one or more neurostimulators, each including an implanted pulse generator, lead and/or extension. The drug-delivery component(s), lead and/or neurostimulator can be configured to be implanted such that a the drug-delivery component and/or stimulating portion of the lead is positioned (for example) in the subthalamic nucleus, globus pallidus interna, caudal zona incerta, pallidofugal fibers, periaqueductal gray, periventricular gray, internal capsule, ventral posterolateral nucleus, ventral posteromedial nucleus, subgenual cingulate gyrus, posterior gyrus rectus, nucleus accumbens, ventral capsule/ventral striatum, inferior thalamic peduncle, lateral habenula, cerebellum, centromedian thalamus, hippocampus, anterior nucleus of the thalamus, motor cortex, caudate, and/or at a seizure focus.

The closed-loop stimulation system can include control electronics that receive electrical-activity data from the one or more electrodes, identify drug-delivery specifications and/or stimulation specifications based on the electrical-activity data, and transmit the specifications to the drug-delivery component(s) and/or lead. For example, the electrical-activity data can be analyzed to detect precipitating indications of a seizure, depression event and/or migraine. Alternatively or additionally, the electrical-activity data can be processed to track a seizure, identify a target for respective surgery, identify an anatomical seizure focus, track progression of a headache or migraine, detect sleep, identify a stage of sleep, identify sleep-related events, detect and/or track cortical spreading depression. Alternatively or additionally, the electrical-activity data can be processed to detect and/or characterize another event corresponding to epilepsy, Parkinson's, depression, a migraine, or Alzheimer's disease.

The processed electrical-activity data can be processed to identify a specification that indicates (for example) that a drug is to be released, which dosage of a drug is to be released, when a drug is to be released, a temporal drug-delivery characteristic (e.g., duration over which a dosage is to be released), that an electric stimulus is to be delivered, when an electrical stimulus is to be delivered, a stimulation amplitude and/or stimulation temporal characteristic. The control electronics may be worn by a patient and not implanted. The control electronics may be connected to the electrode(s), drug-delivery component(s) and/or lead via (for example) one or more electrical wired connections (e.g., traversing through an incision) and/or wirelessly.

In some instances, an implant device includes one or more (e.g., wireless) transmitters and/or one or more (e.g., wireless) receivers, which may (e.g., wirelessly) communicate with one or more non-implanted devices (e.g., an RFID reader, access point or satellite). The wireless communication can include (for example) transmitting data recorded by the implant device and/or to facilitate identifying a location of a person in which the implant device is implanted. In some instances, an implant device includes an intracerebroventricular (ICV) device and/or includes one or more ports (e.g., connected to a catheter that may be positioned within a ventricle). In some instances, an implant device can be configured to facilitate positioning of excess lead wire connected to a deep-brain stimulator.

In some instances, a shape and/or size of an implant device is configured to be implanted into a sub-scalp space but to avoid one or more particular regions of the space (e.g., while a first part of the implant device is positioned at or moving across a first side of a particular region to be avoided and while a second part of the implant device is positioned at or moving across a second opposite side of the particular region). The implant device can be configured such that the implant device can avoid (during implantation and at its final position) being on any part of either of the eye sockets and further avoid being on any nerve (e.g., either occipital nerve).

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

It is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-rearranged. A process is terminated when its operations are completed, but could have additional steps not included in the figure.

While the principles of the disclosure have been described above in connection with specific apparatuses and methods, it is to be clearly understood that this description is made only by way of example and not as limitation on the scope of the disclosure.

What is claimed is:

1. An implant device comprising:
   a central section;
   a set of electrodes;
   a set of branch portions, wherein, for each branch portion of the set of branch portions:
      a first end of the branch portion is connected to the central section;
      the branch portion includes a subset of the set of electrodes, wherein each electrode in the subset is disposed on a bottom surface of the branch portion, wherein the subset of the set of electrodes includes three or more electrodes;
      the branch portion includes multiple vias that extend from the bottom surface of the branch portion to a top surface of the branch portion; and
      at least one electrical trace is disposed on the top surface of the branch portion, wherein the multiple vias electrically connect each of the subset of the set of electrodes to the at least one electrical trace; and
   separation spaces configured to maintain separations between adjacent branch portions of the set of branch portions along a length of the adjacent branch portions, wherein:
      the separation spaces increase a distance between the subset of the set of electrodes disposed on the adjacent branch portions along the length of the adjacent branch portions from the first end of each adjacent branch portion to a second end of each adjacent branch portion disposed distally from the first end,
      two adjacent branch portions of the adjacent branch portions are separated by a groove, and
      the groove is a part of a separation space among the separation spaces, the separation space being between the two adjacent branch portions.

2. The implant device of claim 1, wherein, for each branch portion of the set of branch portions and for each electrode of the subset of the set of electrodes disposed on the bottom surface of the branch portion, a via of the multiple vias is positioned directly adjacent to the electrode.

3. The implant device of claim 1, wherein, for each branch portion of the set of branch portions, at least two of the subset of the set of electrodes are positioned at different points along a horizontal axis.

4. The implant device of claim 1, wherein, for each branch portion of the set of branch portions, the at least one electrical trace is a single electrical trace that is disposed such that the single electrical trace crosses a midline of the branch portion between each successive electrode connection.

5. The implant device of claim 1, further comprising a chip that includes a wireless transmitter, wherein, for each branch portion of the set of branch portions, the at least one electrical trace connects to the chip.

6. The implant device of claim 1, wherein for each branch portion of the set of branch portions, an end portion of the branch portion includes a hole extending through the top surface and the bottom surface.

7. The implant device of claim 1, wherein a thickness of each of the set of branch portions is less than 5 mm.

8. The implant device of claim 1, wherein the set of branch portions include four branch portions.

9. The implant device of claim 1, wherein for each branch portion of the set of branch portions, the branch portion includes a first set of indentations along a first side of the branch portion and a second set of indentations along a second side of the branch portion, the first side being opposite from the second side, wherein the second set of indentations are offset relative to the first set of indentations, the offset being with respect to an axis parallel to the second side.

10. The implant device of claim 1, wherein each branch portion of the set of branch portions is flexible such that it can bend along a length of the branch portion.

11. The implant device of claim 1, wherein each of the branch portions includes a stack that includes:
    an encapsulation layer; and
    a substrate layer;
    wherein the at least one electrical trace is disposed so as to be between the encapsulation layer and substrate layer.

12. The implant device of claim 1, wherein the two adjacent branch portions comprise:
    a first branch portion comprising a first segment proximate the central section and a second segment extending from the first segment of the first branch portion; and
    a second branch portion that is adjacent to the first branch portion and comprises a first segment proximate the central section and a second segment extending from the first segment of the second branch portion,
    wherein the first segment of the first branch portion and the first segment of the second branch portion are separated by the groove.

13. A method comprising:
    positioning an implant device to collect neural recordings from a person, wherein the implant device includes:
    a set of branch portions, wherein, for each branch portion of the set of branch portions:
        a first end of the branch portion is connected to a central section;
        the branch portion includes a subset of a set of electrodes, wherein each electrode in the subset is disposed on a bottom surface of the branch portion, wherein the subset of the set of electrodes includes three or more electrodes;
        the branch portion includes multiple vias that extend from the bottom surface of the branch portion to a top surface of the branch portion; and
        at least one electrical trace is disposed on the top surface of the branch portion, wherein the multiple vias electrically connect each of the subset of the set of electrodes to the at least one electrical trace; and
    separation spaces configured to maintain separations between adjacent branch portions of the set of branch portions along a length of the adjacent branch portions, wherein the separation spaces increase a distance between the subset of the set of electrodes disposed on the adjacent branch portions along the length of the adjacent branch portions from the first end of each adjacent branch portion to a second end of each adjacent branch portion disposed distally from the first end, two adjacent branch portions of the adjacent branch portions are separated by a groove, and the groove is a part of a separation space among the separation spaces, the separation space being between the two adjacent branch portions;
    activating the implant device so as to trigger collecting voltage signals at the set of electrodes and outputting neural-recording signals that correspond to the voltage signals; and
    accessing the neural-recording signals at an electronic device.

14. The method of claim 13, wherein positioning the implant device includes positioning the implant device in a sub-scalp space.

15. The method of claim 14, wherein positioning the implant device in the sub-scalp space includes positioning the implant device in a subgaleal space or another plane.

16. The method of claim 13, wherein the neural-recording signals correspond to chronic data that was collected across a time period longer than two weeks.

17. The method of claim 13, wherein outputting the neural-recording signals includes wirelessly transmitting the neural-recording signals from the implant device, and wherein accessing the neural-recording signals at the electronic device includes wirelessly receiving the neural-recording signals.

18. The method of claim 13, wherein the positioned implant device avoids contact with person's ears, ear muscles, muscles at least partly in eye sockets, and the eye sockets.

19. The method of claim 13, wherein positioning the implant device includes separately and iteratively positioning each of the set of branch portions.

20. The method of claim 13, wherein positioning the implant device includes pulling a suture that is anchored to an implantation tool that is positioned at a target position.

21. The method of claim 13, wherein the implant device includes four branch portions, and wherein positioning the implant device includes positioning the four branch portions to extend to four target areas of a skull, wherein two of the four target areas are on a left side of the person and two of the four target areas are on a right side of the person.

* * * * *